(12) United States Patent
Chaskar

(10) Patent No.: US 7,170,881 B2
(45) Date of Patent: Jan. 30, 2007

(54) METHOD AND APPARATUS PROVIDING USER PROGRAMMABLE, PERSONALIZED LOCATION-AWARE SERVICES

(75) Inventor: Hemant Chaskar, Woburn, MA (US)

(73) Assignee: Nokia Corporation, Espoo (FI)

( * ) Notice: Subject to any disclaimer, the term of this patent is extended or adjusted under 35 U.S.C. 154(b) by 675 days.

(21) Appl. No.: 10/283,808

(22) Filed: Oct. 29, 2002

(65) Prior Publication Data

US 2004/0081120 A1    Apr. 29, 2004

(51) Int. Cl.
*H04Q 11/00* (2006.01)

(52) U.S. Cl. ............ 370/338; 370/352; 370/401; 455/456.1

(58) Field of Classification Search ............ None
See application file for complete search history.

(56) References Cited

U.S. PATENT DOCUMENTS

| 6,236,365 | B1 | 5/2001 | LeBlanc et al. ............ 342/457 |
| 6,486,801 | B1 | 11/2002 | Jones ............ 340/994 |
| 6,754,194 | B2* | 6/2004 | Ramaswamy et al. ...... 370/331 |
| 6,888,811 | B2* | 5/2005 | Eaton et al. ................ 370/338 |
| 2003/0118015 | A1* | 6/2003 | Gunnarsson et al. ........ 370/389 |
| 2003/0142641 | A1* | 7/2003 | Sumner et al. ............. 370/328 |
| 2004/0052232 | A1* | 3/2004 | Ramaswamy et al. ...... 370/338 |

* cited by examiner

*Primary Examiner*—Duc Ho
(74) *Attorney, Agent, or Firm*—Harrington & Smith, LLP

(57) ABSTRACT

A method and system is disclosed to provide a personalized, location related service to a user of a mobile terminal. The method includes: (A) generating a service specification object that comprises a user-specified location and a message to be generated when the user arrives at the location with the MT; and (B) storing the service specification object for later use. The method further entails: (C) tracking the location of the mobile terminal; and when the location of the mobile terminal matches the location in the stored service creation object, (D) generating the message for activating a user-specified action.

34 Claims, 4 Drawing Sheets

METHOD AND APPARATUS PROVIDING USER PROGRAMMABLE, PERSONALIZED LOCATION-AWARE SERVICES

TECHNICAL FIELD

The teachings of this invention relate generally to data communications networks and procedures and, more specifically, relate to techniques for providing services for a mobile node (MN) or mobile terminal (MT) based on the location of the MN or MT, as well as techniques for a user to specify the desired location-related service(s).

BACKGROUND

Currently, cellular and other MT users can subscribe to various location-aware services such as news, maps and local information provided by the wireless network. The wireless network tracks the movement of the MT to determine its location, or obtains the location from the MT if the MT has a Global Positioning System (GPS) receiver, and provides the user-specified content to the user based on the user's location.

There is currently a proposed mechanism for enabling service creation and management in regards to wireless networks. This mechanism in known as the Parlay Application Programming Interface (API), and is reviewed here as it provides a non-limiting example of a system that can be employed during the implementation of the teachings of this invention. The Parlay API has been developed by the Parlay group (www.parlay.org), an open, multi-vendor forum. The Parlay API has been accepted by the third generation partnership project (3GPP) for the Open Services Access (OSA) architecture of next generation cellular systems. The Parlay API is intended to provide an open, standard, technology-independent interface specification between applications and the wireless network functionality.

FIG. 1 shows a conceptual diagram of an application(s) server 1, possibly embodied as a WWW server, a Parlay API layer 2, and one or more underlying, possibly heterogenous wireless networks 3. For example, one of the networks 3 may be a circuit switched network (e.g., a Public Switched Telephone Network (PSTN) network or a Global System for Mobile Communication (GSM) network), while others of the networks 3 may be packet switched networks (e.g., one or more of a General Packet Radio System (GPRS) network, a Universal Mobile Telephone System (UMTS) network, a cdma2000 network or a WLAN communication network). The Parlay API layer 2 is intended to enable service portability across heterogenous networks. The Parlay API 2 provides a logical separation of service logic and network functionality, enabling customized third party services to be offered. A function of the Parlay API 2 is to hide the complexity of the target network(s) from the service logic and, by extension, the developers of the service logic. That is, a desired service can be developed to run on the application server 1 without regard for the specifics of the network 3. An important aspect of the Parlay API layer 2 is that it enables the service logic of the application 1 to use information and control capabilities of the networks 3, including network 3 call control, billing and MT location functions.

FIG. 2 is a more detailed view of the Parlay API 2 in the context of the OSA architecture. The application servers 1 are shown to include, by example, enterprise applications 1A and client applications 1B. Communication with the network 3 occurs through the Parlay APIs 2 over an administrative boundary 4. The network 3 is shown as including a network framework 5 and service capability servers (SCS) 6. The SCS 6 includes, by example, a call control server 7, a location server 8 and other servers 9. The framework 5 functions as a name server for the distributed network architecture, where available services, such as the call control 7, location 8, billing and so forth register their availability. The framework 5 serves as a first point of contact for consumers of the services, such as third party applications (e.g., the WWW server 1). A service consumer can discover the available services by querying the framework 5. The framework 5 also performs authentication of consumers and directs them to the actual service that resides in the SCS 6. The framework 5 may also accomplish performance-related tasks such as load balancing across different SCSs 6 offering the same service. The functionality provided by SCS 6 is referred to as the Service Capability Feature (SCF).

In the illustrated embodiment a first Parlay API 2 is available between the framework 5 and the client applications 1B, and is referred to for this example as an Authentication, Access Control and Service Discovery API. Second Parley APIs (SCF Usage) are available between the client applications 1B and the call control server 7, the location server 8 and the others server 9. A third Parley API 2 (Service Registrations, Integrity, Multi-Domain Support) is used between the framework 5 and the SCS 6. A fourth Parley API (Enterprise Application Subscription) is specified between the Enterprise Applications 1A and the framework 3, while a fifth Parley API 2 is defined between the Enterprise Applications 1A and the SCS 6, and is a counterpart to the second Parlay API when the consumer is the enterprise applications 1A. Normally the enterprise applications 1A engage in aggregate service contract with the network provider and maintain fine-grained control within themselves.

In the context of location-aware services, it should be noted that, at present, while the user is provided the option to subscribe to different services, the services themselves are not personalised. This is further explained below for the exemplary case that can arise during a cellular (e.g., GPRS or UMTS) to wireless local area network (WLAN) seamless inter-technology handoff.

In this case assume that the user's MT has two wireless RF interfaces, i.e., a cellular interface and a WLAN interface (e.g., a IEEE 802.11 or a Hyperlan interface). When the user runs an application, such as a voice over Internet Protocol (VoIP) call over the cellular network (for example while driving), the user typically desires to have the WLAN interface switched off for power saving purposes. However, when the user arrives at a certain location where the user can access a WLAN, such as the user's home or office, the user wishes to switch seamlessly (and automatically) to the WLAN. For this to occur the WLAN interface of the MT should be activated when the user comes close to the certain location where the WLAN is available so that the WLAN interface can begin scanning for the WLAN access point beacons, and can then register with the WLAN to enable the cellular/WLAN handoff to occur.

Prior to this invention, such highly personalized location-aware applications could not be realized with conventional wireless networks and MTs, with or without the use of the Parlay API.

SUMMARY OF THE INVENTION

The foregoing and other problems are overcome by methods and apparatus in accordance with embodiments of this invention.

This invention provides embodiments of communication networks and MTs that enable personalized, user specified, location-aware Service Creation and Notification procedures to be realized. The Service Creation procedure enables the user to define a personalised location-aware service, while the Notification procedure is used to generate pre-programmed messages to appropriate user processes when the user arrives at a user-specified location. The user processes that receive the pre-programmed messages may reside in the network or in the MT, depending on the nature of service.

A method and system is disclosed to provide a personalized, location-aware service to a user of a MT. The method includes: (A) generating a service specification object that includes at least in part a user-specified location and a message to be generated when the user arrives at the location with the MT; and (B) storing the service specification object for later use. The method further entails: (C) tracking the location of the mobile terminal; and when the location of the mobile terminal matches the location in the stored service specification object, (D) generating the message for activating a user-specified service.

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

This invention provides in one embodiment a mechanism and a process whereby a user (with a MT), when physically present at certain location, is enabled to create a location-aware service that is significant for that location, so that the user can avail himself or herself of the service during future visits to this certain location. In another embodiment the user need not be physically present at the certain location, so long as the user can identify the certain location with sufficient specificity, when performing the task of location-aware service creation. For example, the service creation can take place offline using a PC or some other suitable terminal communicating with applications server over the Internet, if the user knows the coordinates (such as cell ID, GPS coordinates, etc.) of the location of interest. The user may also employ a characteristic semantic specification of the location (rather than actual coordinates) that can be understood by the network server 20 or third party application server 1 and converted to location coordinates. For example, the user may specify the location of interest as "all WLAN hot-spots" covered by a particular network operator, or "all WLAN hot-spots at airports covered by a certain operator". The network server 20 or application server 1 is then enabled to map such a characteristic specification of location to the actual coordinates of the location(s) of interest using a database of actual coordinates, or by any suitable technique.

The desired result is that when the user carrying the MT is located at the specified coordinates, or is within some radius of the specified coordinates, the user-desired service is triggered or initiated. One non-limiting example of a user-desired, location-specific or location-aware service is a message that is generated to cause the WLAN interface of the MT to become active.

Figure 1:
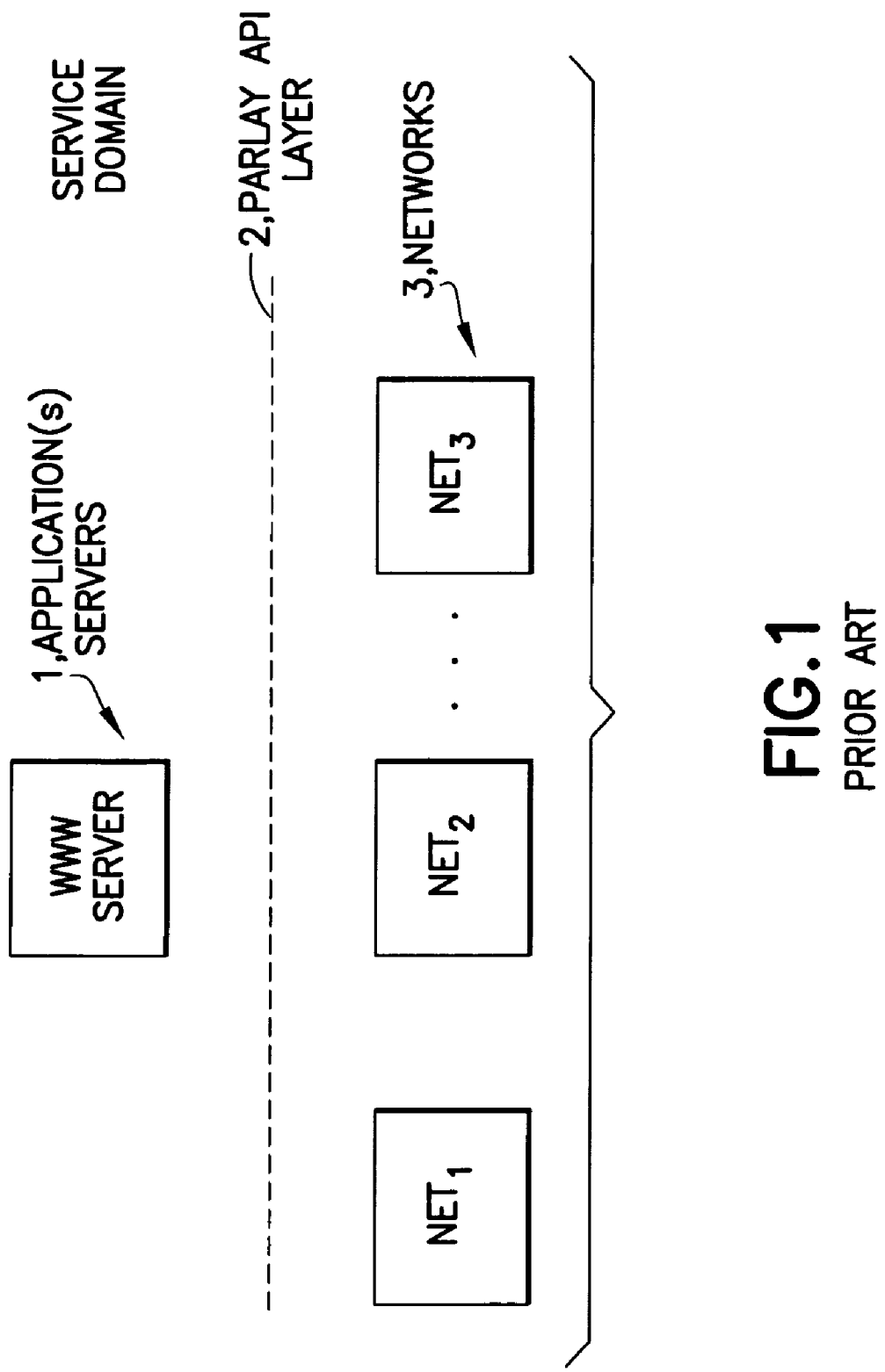
FIG. 1 is a block diagram showing the relationship between a Parlay API layer and service and network domains.
Figure 2:
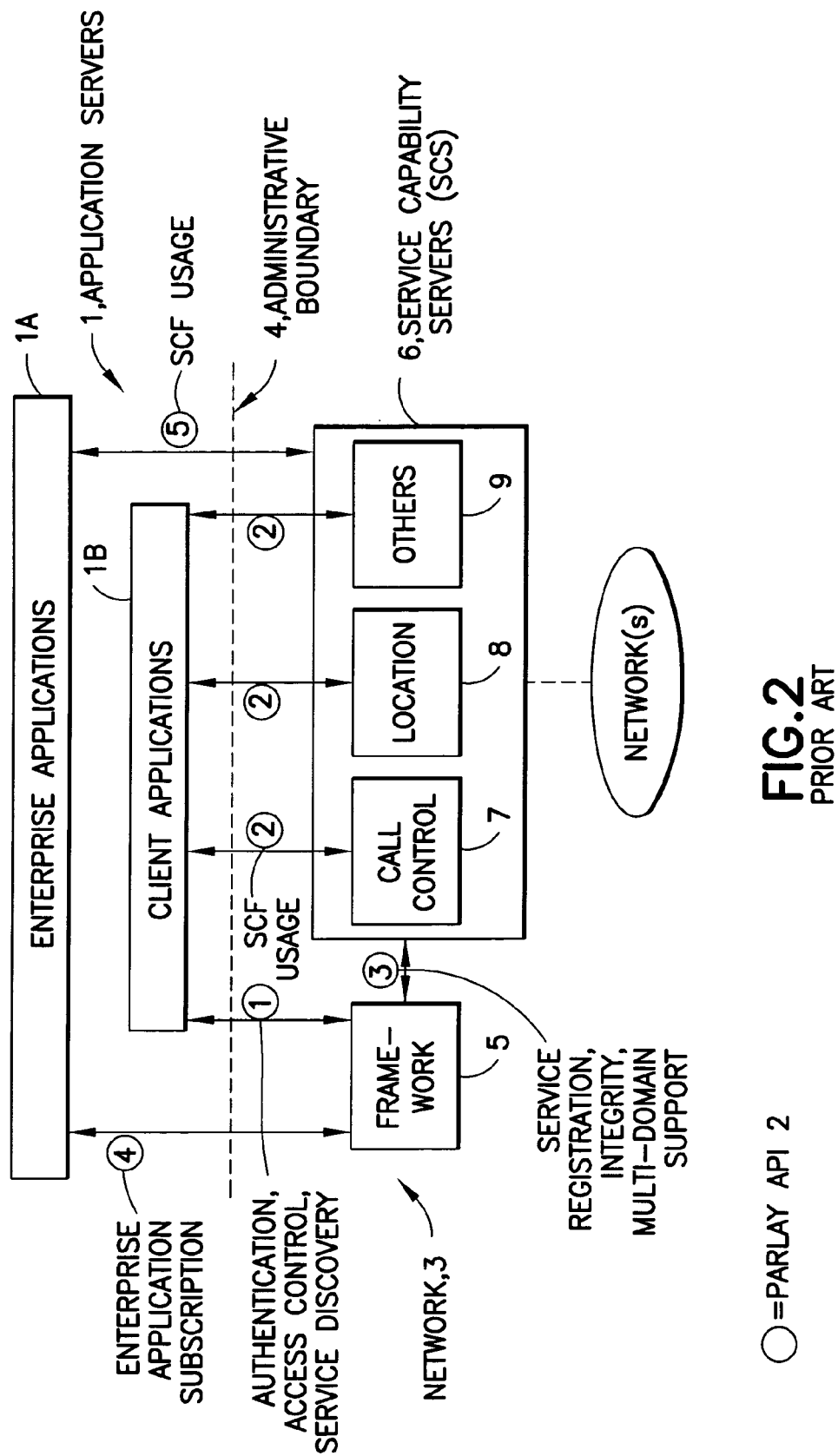
FIG. 2 is a more detailed block diagram showing the use of Parlay APIs between application servers and a wireless network.
Figure 3:
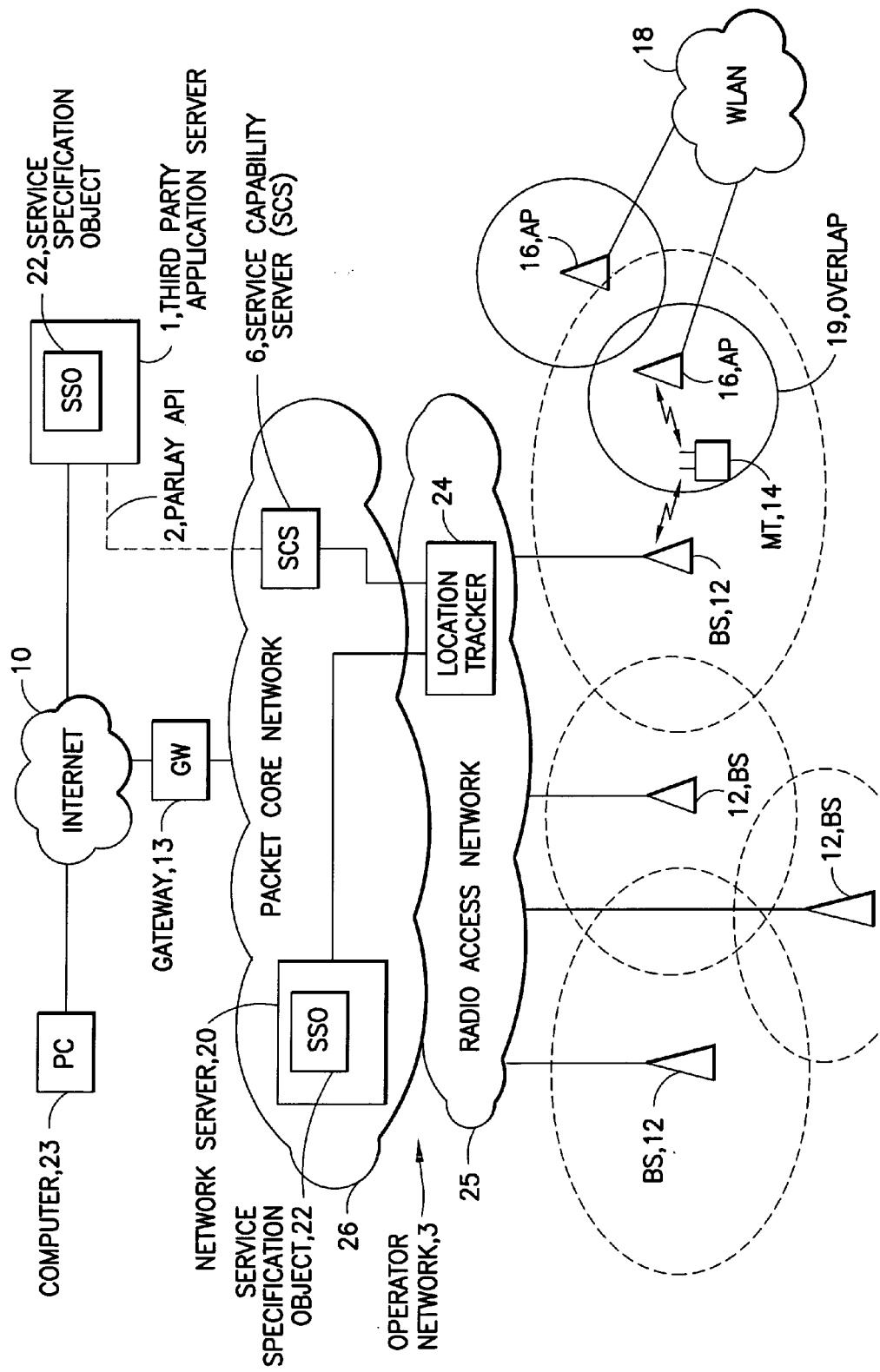
FIG. 3 is a network architecture diagram in accordance with an aspect of this invention.

FIG. 3 is a network architecture diagram that illustrates an embodiment of this invention, and illustrates the operator network 3 that contains a radio access network 25 and a packet core network 26. The MT 14 can connect to the operator network 3 via Base Stations (BS) 12. The operator network 3 is connected to the Internet 10 through gateway 13. The operator network 3 contains a location tracker function 24 which can determine the location of the MT 14 using techniques such as cell ID or triangulation. The operator network 3 also contains a network server 20 which enables the creation and provision of the location-aware services described herein. Network server 20 has access to the location tracker 24 of the radio access network 25. Network server 20 may store and maintain a Service Specification Object (SSO) 22. The operator network 3 also contains SCS 6 that enables third party application server 1 to access information in the network 3 (such as location of the MT 14 connected to network 3) over a Parlay API. Third party application server 1 may also store and maintain SSO 22. The SCS 6 also has access to location tracker 24. A computer 23 connected to Internet 10 can communicate over the Internet 10 with the network server 20, with the third party application server 1, or with the MT 14 connected to operator network 3, for the purposes of service creation.

Figure 5:
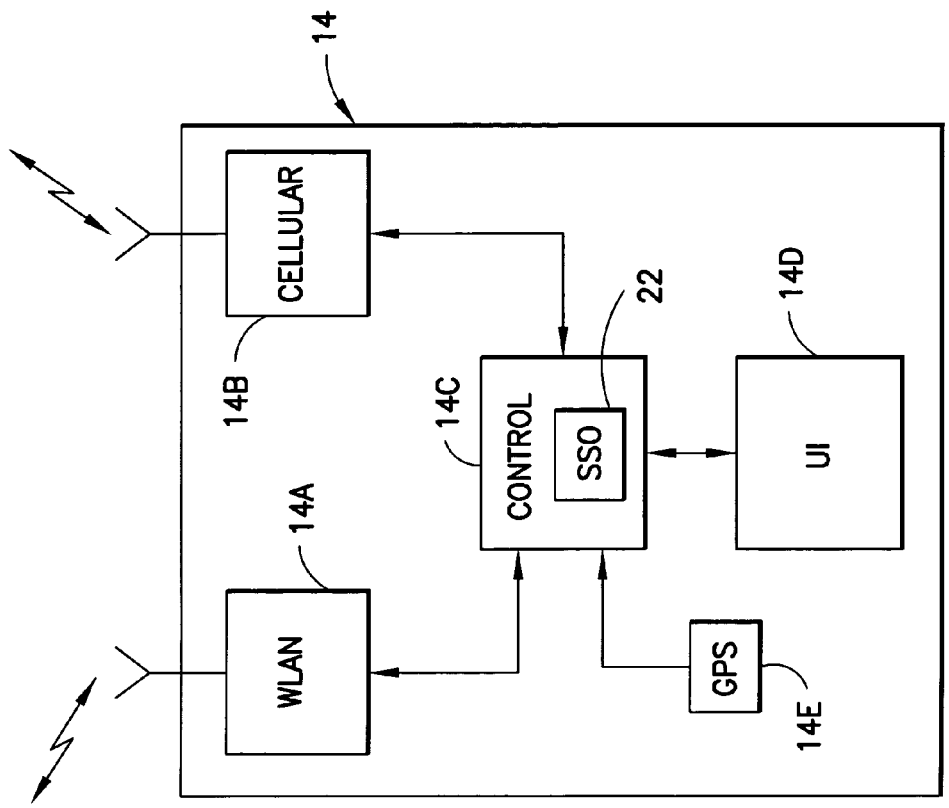
FIG. 5 is a block diagram of a mobile terminal that is suitable for use in practicing the teachings of this invention.

Referring also to FIG. 5, in this example it is assumed that the MT 14 has two radio interfaces, namely a cellular interface 14B for connecting with BSs 12 of the network 3, and a WLAN interface 14A for connecting with APs 16 of a WLAN 18. The MT 14 also includes a control unit 16C, such as a programmed microprocessor, and may include a user interface (UI) 14D. There is an area of overlap 19 shown in FIG. 3 between the operator network 3 and the WLAN 18 where the MT 14 can receive service from either the WLAN 18 or the operator network 3, and can thus be handed off from one to another. Note that a plurality of WLANs (not shown) could be present, and that the operator network 3 may overlap with a plurality of other operator networks (not shown).

It should be noted that the SSO 22 can be stored in the network server 20, or in the application server 1, or it could be located in the MT 14, as described below for the Service Creation cases (ii) and (iii). The creation and use of the SSO 22 will now be described in detail below.

By way of example, several techniques for the creation and provision of personalised location-aware services are now described in the context of specific and non-limiting embodiments or cases.

Case (i): Network Based Location Tracking and Message Generation

In this case the network server 20 has the responsibility to track the location of the MT 14, as well as to generate the appropriate trigger messages to activate the service when the MT 14 arrives at the user-specified location. If the SSO 22 is located in third party application server 1, server 1 queries SCS 6 over Parlay API 2 to determine the location of the MT 14. The server 1 can then send a trigger message to activate the service. As was noted above, the network server 20 and the SCS 6 have access to the location tracking function 24 of operator network 3. In another embodiment, the network server 20 may push (location tags in) SSO 22 to an entity co-located with location tracker 24 and request notification upon a match. For example, in GPRS, this entity could be the SGSN (Serving GPRS Support Node) which always has up-to-date knowledge of the location of the MT 14. Similarly, server 1 can register (location tags in) SSO 22 with SCS 6, which in turn may push then to entity co-located with location tracker 24.

Case (ii): Network Based Location Tracking and MT 14 Based Message Generation

In this case the network has the responsibility to track the location of the MT 14. It then informs the MT 14 of its current location and the MT 14 has the responsibility to generate the appropriate trigger messages to activate the user-specified service when the MT 14 arrives at the specified location. Here, the MT 14, sends periodic requests to location tracker 24 for location information (possibly via server 20 or server 1). Alternatively, location information is periodically pushed to MT 14. Which of these modes to follow can be specified at the time of creation of the SSO 22.

For Cases (i) and (ii), the MT 14 need not have location tracking functionality of its own, rather the location tracking function 24 of the network 3 can be used. For Cases (i) and (ii) the location tracking function 24 can be based simply on cell ID based location tracking. Other network based location tracking techniques, such as triangulation, can be used as well.

Case (iii): MT 14 Based Location Tracking and Message Generation

In this case the MT 14 tracks its location, such as by the use of a GPS receiver 14E shown in FIG. 5, and also generates the appropriate trigger messages to activate the desired service when the MT 14 arrives at the specified location. Thus, for Case (iii) the existence of some location tracking functionality, such as the GPS receiver 14E or AGPS, is assumed to be present in or otherwise available to the MT 14, which allows the MT 14 to self-locate itself.

These embodiments are now further described for the exemplary service of activating the powered down or sleeping WLAN radio interface 14A of the MT 14 when the user carrying the MT 14 arrives at a pre-specified location, thereby enabling an inter-technology handoff (cellular to WLAN in this embodiment) to be performed. Other location-based services may also be implemented.

A description of the procedures of location-aware Service Creation and Notification is now provided.

Service Creation

During this procedure, a user specifies: (a) the location where a certain message should be generated; (b) the entity that is to track the MT 14 location (e.g., location tracker 24 or GPS receiver 14E); (c) the message(s) to be generated at the location specified in (a) (e.g., activate the WLAN interface 14A); (d) the originator of the message(s); (e) the receiver of the message(s); and (f) the action(s) to be performed upon generation/reception of the messages.

Of these, step (a) can be performed by being physically present (e.g., while carrying MT 14) at the location (e.g. home, office, store, etc.), or by specifying coordinates of the location, or by some characteristic specification that allows the network server 20 or third party server 1 to identify the coordinates of the location(s) the user is referring to. An example of the last case is a location specification such as, "all WLAN hot-spots covered by a particular operator". Such a specification in turn allows the network server 20 or third party server 1 to provide the user with a specified service when, for example, the MT 14 arrives at an airport covered by the operator's WLAN.

An example is now described of the Service Creation procedure for the exemplary scenario of the inter-technology handoff described above. During the Service Creation procedure the user creates a data object, the SSO, of the form described below. The SSO can be created from the MT 14 or from some computer 23 connected to server 20 in the network 3 or server 1, over the Internet 10. One suitable server may be one affiliated with the assignee of this patent application, and known as "Club Nokia"™. The SSO 22 is subsequently stored in and maintained by the network server 20, or third party application server 1, or in the MT 14 shown in FIG. 3.

Case (i): Network Based Location Tracking and Message Generation

Tag:
Location=<"This">/<Coordinates>/<Characteristic>, Radius=<value>;

The "/" symbol in this logical expression implies an OR function. The value "This" is used when the service creation is performed when the MT 14 is physically present at the location. In addition, the MT 14 will be connected to either network server 20 or server 1 for uploading SSO 22, or MT14 can be continuously connected to the network server 20 or server 1, which guide the MT14 through the service Creation procedure over a web-based interface. In this case network server 20 determines the co-ordinates of current location of MT 14 or server 1 queries SCS 6 for the location information. If the MT 14 has GPS functionality, the value "This" can be locally replaced by appropriate coordinates. Thus, the value "This" is automatically replaced by the appropriate coordinates of the MT 14 current location. The value "Coordinates" is used when the user explicitly provides a coordinate set to describe the current or a desired location. The value "Characteristic" is used when the user implicitly provides the coordinate set, such as by entering a character string such as "Airport" or "Shopping Mall". In this case the network server 20 or third party application server 1 looks up or otherwise determines the appropriate coordinate set. For the last two cases, service creation can be preformed from computer 23 connected to network server 20 or third party application server 1 over the Internet 10, for the purpose of uploading SSO 22 (and for guiding the service creation procedure). The value of "Radius" can be defaulted to some suitable value (e.g., one kilometer),or it can be specified with any desired precision (e.g., 200 meters), depending on the nature of the service to be provided at the specified location. In general, it may be preferred to require the entry of the value of Radius when more accurate location tracking techniques (triangulation) are used. On the other hand, if coarse location tracking techniques, such as cell ID, are used, the Radius specification may be optional.

Location Tracker:
Tracker=<"Network">;

This field specifies which entity is to be responsible for tracking the MT 14 location for when providing the service. Note that when "Network" is specified, and if the SSO 22 is stored on the network server 20, the server 20 can track the location of the MT 14 using location tracker 24. If the SSO 22 is stored on the third party application server 1, the server 1 can track the location of the MT 14 by querying the SCS 6 over the Parlay API 2. The SCS 6 can obtain the location of the MT 14 from the locating tracker 24.

Service Profile:
Message="Wake up WLAN"
Originator=<"Network">
Receiver=<"Terminal">
Action=<Activate WLAN interface 14A upon receiving this message>.

Note that in this example it is assumed that the control unit 14C of the MT 14 recognizes the incoming message from the network server 20 or the third part application server 1, and can take the appropriate action. That is, the mapping of Message to Action is performed by the control unit 14C. Note as well that the value of Action may not need to be expressly specified as it maybe already programmed into the MT 14 and accessible to the control unit 14C.

In the foregoing (and subsequent) examples it is possible to provide an optional Tag representing other criteria, such as "Time" and/or "Date". For example, one may wish to activate the WLAN interface 14A when near to one's office only on weekdays between 8:00 AM and 5:00 PM, otherwise only the cellular interface 14B should be used.

The resulting service creation object composed by the MT 14, in cooperation with the control unit 14C and the UI 14D, is then sent to the network server 20 or third party application server 1 and stored in a user profile as the Service Specification Object 22. Note that in this and the following cases multiple tags (corresponding to different location tracking technologies) may be associated with the same SSO.

When the Service Creation function is performed off-line, such as by accessing the network server 20 or third party server 1 from the PC 23, the identity of the MT 14, such as the phone number, is preferably provided as well when the value "Terminal" is used for any of the fields. For the off-line Service Creation function the resulting SSO can be forwarded to the network server 20 for storage, or it can be stored and maintained external to the network 3, such as by the third party application server 1 as shown in FIG. 3 (which may be the same server used for the Service Creation function).

Case (ii): Network Based Location Tracking and MT 14 Based Message Generation
Tag:
Location=<"This">/<Coordinates>/<Characteristic>, Radius=<value>;
Location Tracker:
Tracker=<"Network">;
Service Profile:
Message="Wake up WLAN"
Originator=<"Terminal">
Receiver=<"Terminal">
Action=<Activate WLAN interface 14A upon receiving this message>.

In this case the SSO 22 is resident in the MT 14. If the off-line Service Creation function is used the resulting SSO 22 is forwarded via the network 3 to the MT 14. This case is useful to preserve privacy of service. In this case, if the location tracking via periodic push from network to MT 14 is used, a push request is registered with network server 20 or the third party application server 1.

Case (iii): MT 14 Based Location Tracking and Message Generation
Tag:
Location=<"This">/<Coordinates>/<Semantic>, Radius=<value>;

The value "This" is used when the service creation is performed when the MT 14 is physically present at the location. In this case the MT 14 automatically replaces the value "This" with appropriate coordinates of the location, as determined locally by the GPS receiver function 14E. The value of "Semantic" is replaced by appropriate location coordinates stored in the MT 14 or obtained from the network server 20 or third party server 1.

Location Tracker:
Tracker=<"Terminal">;
Service Profile:
Message="Wake up WLAN"
Originator=<"Terminal">
Receiver=<"Terminal">
Action=<Activate WLAN interface 14 upon receiving this message>.

As for case (ii), the SSO 22 is assumed to be stored in the MT 14. If the off-line Service Creation function is used the resulting SSO 22 can be forwarded via the Internet 10 and network 3 to the MT 14.

Notification Procedure:

Case (i): Network Based Location Tracking and Message Generation

The network server 20 or third party server 1 compares the current location (cell ID or another appropriate parameter depending upon the location tracking technology used) of the MT 14 with the Location tags of the user's stored SSO 22 or SSOs (as a plurality of different SSOs may be present). When the current location matches a Location specified in a tag, the user-programmed message (e.g., "Wake up WLAN") is generated by the network server 20 or third party server 1. This message is sent to the MT 14, as the user process of activating the WLAN interface 14A resides in the MT 14 in this case. Upon receiving this message, the control unit 14C of the MT 14 maps the message to pre-programmed actions and activates the WLAN interface 14A.

Case (ii): Network Based Location Tracking and MT 14 Based Message Generation The MT 14 requests the network 3 to provide the MT 14 location information (e.g., based on cell ID, or triangulation). Alternatively, the network 3 can periodically push the location information to the MT 14. The MT 14 compares the network 3 derived location information with the tags of the user's SSOs. When the current location matches the tag, the user-programmed message ("Wake up WLAN") is generated. Upon the generation of this message, the pre-programmed action of activating WLAN interface 14A is performed.

Note with regard to case (ii) that if the user process that is intended to act on the message resides in the network 3, or in another network such as the Internet 10, then the MT 14 transmits the message to the appropriate process in the network 3 or in the Internet 10 (via the network 3). Note also with regard to case (i), that if the process that is intended to act on the message resides elsewhere than the MT 14, then the network server 20 or third party application server 1 sends the message to the remotely located user process.

Case (iii): MT 14 Based Location Tracking and Message Generation

The MT 14 compares the current GPS-derived coordinates with the tags (within the specified radius) of the SSOs stored in the MT 14. When the current GPS coordinates match the tag, the user-programmed message (e.g., "Wake up WLAN") is generated. Upon the generation of this message, the associated user-programmed actions (activating the WLAN interface 14A) are performed. As for case (ii), if the user process that is intended to act on this message resides in the network 3, then the MT 14 transmits the message to the appropriate process in the network 3. If it resides elsewhere in the Internet 10, the MT 14 transmits the message to that process over the network 3 and over the Internet 10.

For the forgoing cases an application can be run in the MT 14 (e.g., one based on JAVA) to facilitate the Service Creation procedure. Web-based Service Creation sessions may also be employed. The application, if run in the MT 14, may use the control unit 14C and the UI 14D to prompt the user to enter the required values for Location, Location Tracker, Message, etc. If the web-based interface is used, the web server can prompt the user for this information. The format and operation of the data entry application can assume many forms, as should occur to those skilled in the art when guided by the foregoing teachings. Intelligence may reside in control unit 14C or web server(s) to check the consistency of the information entered by user. For example, a user with an MT 14 that lacks a self-locate capability cannot enter the value "terminal" as the location tracker.

The transfer of the various messages, including the Notification message(s) between the MT 14 and the user process, or between server 20 (server 1) and the user process, may use Short Message Service (SMS) messages, or IP messages such as the Internet Control Messaging Protocol (ICMP), the User Datagram Protocol (UDP), the Transmission Control Protocol (TCP), or any other standard method of message transfer between two nodes in an IP network, including higher level message protocols such as Session Initiation Protocol (SIP) and HTTP. Communication between the network server 20 and the location tracker 24, or between the SCS 6 and the location tracker 24, may occur over a proprietary interface or over a standard interface, such as IP. In non-IP networks other appropriate messaging protocols can be employed. Note as well that the originator and/or receiver of a message can be specified using Uniform Resource Locators (URLs) or Universal Resource Identifiers (URIs).

Figure 4:
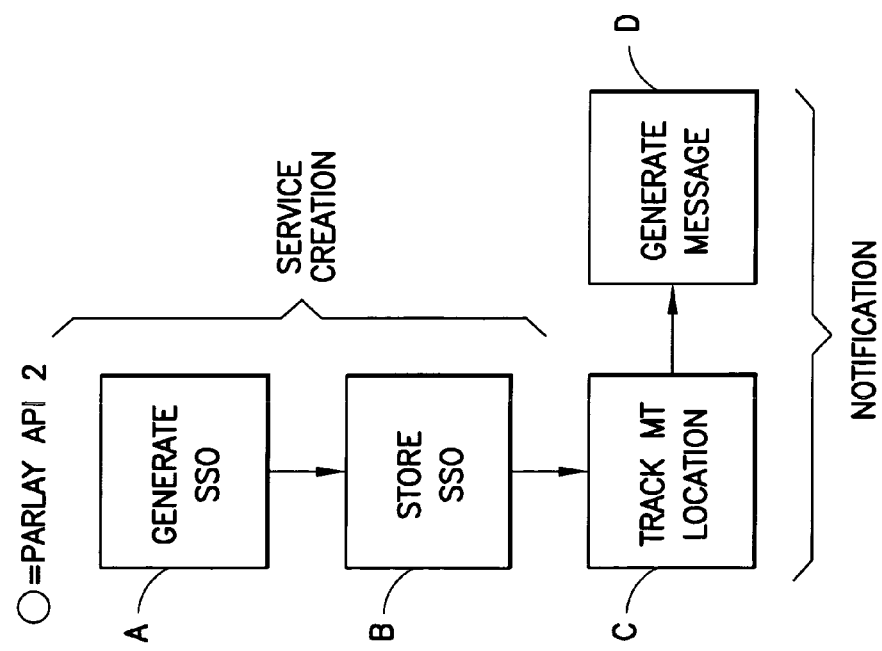
FIG. 4 is a logic flow diagram in accordance with the invention.

Based on the foregoing description it can be realized that this invention encompasses a method to provide a personalized, location related service to a user of the MT 14. Referring to FIG. 4, the method includes: (A) generating a service specification object that comprises a user-specified location and a message to be generated when the user arrives at the location with the MT 14; and (B) storing the service specification object for later use. The method further entails: (C) tracking the location of the mobile terminal; and when the location of the mobile terminal matches the location in the stored service creation object, (D) generating the message for activating a user-specified action.

This invention should not be construed to be limited to only the WLAN interface activation application discussed above. As one additional example, the user may specify the location of a train station, and the Notification function in this case downloads from a transportation provider WWW server to the MT 14 a current train schedule (possibly indicating any delayed trains) upon the MT 14 entering the indicated distance radius from the location of the train station. Note further that the schedule can be personalized. As an additional example, the user may specify the location of a shopping mall, and the Notification function in this case downloads from a shopping mall WWW server to the MT 14 a summary of sales being held by various merchants upon the MT 14 entering the indicated distance radius from the location of the shopping mall. The list of merchants can be personalized. As one further example, the user may specify some location along a route that the user commutes into a city, and the Notification function in this case downloads from a governmental or private WWW server to the MT 14 a real-time traffic condition report upon the MT 14 entering the indicated distance radius from the location, thereby enabling the user to be informed of traffic problems and the existence of possible alternate routes.

Thus, while this invention has been particularly shown and described with respect to certain preferred embodiments thereof, it will be understood by those skilled in the art that changes in form and details may be made therein without departing from the scope and spirit of these teachings.

What is claimed is:

1. A method to provide a personalized, location related service to a user of a mobile terminal, comprising:
    generating a service specification object that comprises a user-specified location, a message to be generated when the user arrives at the location with the mobile terminal, an identification of a first entity that is responsible for tracking the location of the mobile terminal and an identification of a second entity that is responsible for generating the message;
    storing the service specification object for later use;
    tracking the location of the mobile terminal by the first entity; and
    when the location of the mobile terminal matches the location in the stored service specification object, generating, by the second entity, the message for activating a predetermined action.

2. A method as in claim 1, where the user specifies the location implicitly.

3. A method as in claim 1, where the user specifies the location explicitly.

4. A method as in claim 1, where the first entity is the mobile terminal and the second entity is one of the mobile terminal or a wireless network.

5. A method as in claim 1, where the first entity is a wireless network and the second entity is one of the mobile terminal or the wireless network.

6. A method as in claim 1, where the service specification object is stored in the mobile terminal.

7. A method as in claim 1, where the service specification object is stored in a wireless network.

8. A method as in claim 1, where the service specification object is stored in a server reachable through the Internet.

9. A method as in claim 1, where the service specification object is stored in a server that can communicate with a wireless network over a Parley Application Programming Interface.

10. A method as in claim 1, where the service specification object further comprises an identification of third entity that is to receive the message.

11. A method as in claim 10, where the third entity comprises a mobile terminal.

12. A method as in claim 10, where the third entity comprises a user process specified by one of a URL or URI.

13. A method as in claim 1, where generating the service specification object comprises the use of a mobile terminal user interface.

14. A method as in claim 1, where generating the service specification object comprises the use of a computer coupled to the Internet.

15. A method as in claim 1, where the user specified action comprises activating a wireless local area network interface of the mobile terminal.

16. A system to provide a personalized, location related service to a user of a mobile terminal, comprising:
- a generator for generating a service specification object that comprises a user-specified location, a message to be generated when the user arrives at the location with the mobile terminal; an identification of a first entity that is responsible for tracking the location of the mobile terminal and an identification of a second entity that is responsible for generating the message;
- data storage for storing the service specification object for later use;
- a location tracker, located at or in the first entity, for tracking the location of the mobile terminal; and
- a message generator, located at or in the second entity, responsive to the location of the mobile terminal matching the location in the stored service creation object, for generating the message for activating a predetermined action.

17. A system as in claim 16, where the user specifies the location implicitly.

18. A system as in claim 16, where the user specifies the location explicitly.

19. A system as in claim 16, where the first entity comprises the mobile terminal and the second entity comprises one of the mobile terminal or a wireless network.

20. A system as in claim 16, where the first entity comprises a wireless network and the second entity comprises one of the mobile terminal or the wireless network.

21. A system as in claim 16, where the mobile terminal comprises the data storage.

22. A system as in claim 16, where a wireless network comprises the data storage.

23. A system as in claim 16, where a server reachable through the Internet comprises the data storage.

24. A system as in claim 16, where a server capable of communicating with the wireless network through a Parley Application Programming Interface comprises the data storage.

25. A system as in claim 16, where the generator is comprised of a mobile terminal user interface.

26. A system as in claim 16, where the generator is comprised of a computer coupled to the Internet.

27. A system as in claim 16, where the user specified action comprises activating a wireless local area network interface of the mobile terminal.

28. A system as in claim 16, where the service specification object further comprises an identification of third entity that is to receive the message.

29. A system as in claim 28, where the third entity comprises a mobile terminal.

30. A system as in claim 28, where the third entity comprises a user process specified by one of a URL or a URI.

31. A unit, comprising:
- means for generating information that comprises a user-specified location and a message to be generated when a mobile terminal arrives in a vicinity of the location; and
- means for sending the information for storage in a memory;
- said unit operable with means for tracking the location of the mobile terminal and with means, responsive to the location of the mobile terminal matching the location in the stored service specification object, for generating the message for activating a predetermined action,
- where the service specification object further comprises an identification of said means for tracking the location of the mobile terminal, and further comprises an identification of said means for generating the message.

32. A unit as in claim 31, where the unit is comprised of the mobile terminal, where said generating means is comprised of a user interface and where said sending means is comprised of a radio frequency interface.

33. A unit as in claim 32, where said mobile terminal is further comprised of means for communicating with a wireless local area network; and a programmed data processor that is responsive to a receipt of the message for activating the communicating means.

34. A unit as in claim 31, where the unit is comprised of a computer, and where said sending means is comprised of a communications network.

* * * * *